US011562042B2

(12) United States Patent
Zheng et al.

(10) Patent No.: US 11,562,042 B2
(45) Date of Patent: Jan. 24, 2023

(54) INTELLIGENT HOTSPOT SCATTERING METHOD, APPARATUS, STORAGE MEDIUM, AND COMPUTER DEVICE

(71) Applicant: GUIZHOU BAISHANCLOUD TECHNOLOGY CO., LTD., Guiyang (CN)

(72) Inventors: Yousheng Zheng, Guiyang (CN); Kang Wang, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/430,399

(22) PCT Filed: Feb. 14, 2020

(86) PCT No.: PCT/CN2020/075343
§ 371 (c)(1),
(2) Date: Aug. 12, 2021

(87) PCT Pub. No.: WO2020/164612
PCT Pub. Date: Aug. 20, 2020

(65) Prior Publication Data
US 2022/0107986 A1 Apr. 7, 2022

(30) Foreign Application Priority Data

Feb. 15, 2019 (CN) .......................... 201910117615.5

(51) Int. Cl.
*G06F 16/955* (2019.01)
*G06F 16/957* (2019.01)
(Continued)

(52) U.S. Cl.
CPC ........ *G06F 16/9566* (2019.01); *G06F 16/951* (2019.01); *G06F 16/9574* (2019.01); *G06K 9/6218* (2013.01); *H04L 67/1019* (2013.01)

(58) Field of Classification Search
CPC ..... H04L 47/10; H04L 67/10; H04L 67/1036; H04L 67/1019; H04L 43/16; H04L 45/22; H04L 47/125
See application file for complete search history.

(56) References Cited

U.S. PATENT DOCUMENTS 7,680,858 B2 * 3/2010 Poola .................... G06F 16/951
707/736
8,964,546 B1 * 2/2015 Jain .................... H04L 43/0882
370/232
(Continued)

FOREIGN PATENT DOCUMENTS

CA         2805067 A1    8/2013
CN      104618493 A    5/2015
(Continued)

OTHER PUBLICATIONS

The World Intellectual Property Organization (WIPO) International Search Report for PCT/CN2020/075343 dated May 20, 2020 5 Pages (including translation).
(Continued)

*Primary Examiner* — Tonia L Dollinger
*Assistant Examiner* — Linh T. Nguyen
(74) *Attorney, Agent, or Firm* — Anova Law Group, PLLC

(57) ABSTRACT

An intelligent hotspot scattering method includes learning request quantity curves of a plurality of URLs based on an artificial intelligence learning model and performing request quantity prediction on the plurality of URLs, determining a first URL from the plurality of URLs, determining a second URL from the plurality of URLs, and performing a hotspot
(Continued)

scattering operation on the URLs. A predicted request quantity of the first URL is greater than or equal to a first predetermined request quantity threshold corresponding to the first URL. A request quantity of the second URL is not predictable and an actual request quantity of the second URL is greater than or equal to a second predetermined request quantity threshold corresponding to the second URL.

20 Claims, 3 Drawing Sheets

(51) Int. Cl.
　　*G06F 16/951*　　(2019.01)
　　*G06K 9/62*　　(2022.01)
　　*H04L 67/1019*　　(2022.01)

(56) References Cited

U.S. PATENT DOCUMENTS

| | | | |
|---|---|---|---|
| 10,261,938 B1* | 4/2019 | Jenkins | G06F 16/9574 |
| 2004/0174888 A1* | 9/2004 | Bradford | H04L 47/125 |
| | | | 370/398 |
| 2008/0319639 A1* | 12/2008 | Yamane | G08G 1/0104 |
| | | | 701/118 |
| 2012/0042063 A1* | 2/2012 | Borade | G06F 16/176 |
| | | | 709/224 |
| 2015/0161257 A1* | 6/2015 | Shivaswamy | G06F 16/951 |
| | | | 707/709 |
| 2016/0088013 A1* | 3/2016 | Watson | H04L 63/0227 |
| | | | 726/25 |
| 2017/0026264 A1* | 1/2017 | Ishikawa | H04L 43/16 |
| 2017/0366604 A1* | 12/2017 | McDuff | H04L 47/822 |
| 2018/0324144 A1 | 11/2018 | Shi et al. | |
| 2019/0005393 A1* | 1/2019 | Guo | G06N 5/04 |

FOREIGN PATENT DOCUMENTS

| | | |
|---|---|---|
| CN | 106161485 A | 11/2016 |
| CN | 107124630 A | 9/2017 |
| CN | 109327550 A | 2/2019 |
| KR | 20050021752 A | 3/2005 |

OTHER PUBLICATIONS

India Intellectual Property Patent Office Examination Report for Application No. 202127039174 dated Mar. 9, 2022 6 Pages.

* cited by examiner

INTELLIGENT HOTSPOT SCATTERING METHOD, APPARATUS, STORAGE MEDIUM, AND COMPUTER DEVICE

CROSS-REFERENCE TO RELATED APPLICATIONS

The present application is a national stage entry under 35 U.S.C. § 371 of International Application No. PCT/CN2020/075343, filed Feb. 14, 2020, which claims the priority to Chinese Patent Application No. 201910117615.5, titled "INTELLIGENT HOTSPOT SCATTERING METHOD, APPARATUS, STORAGE MEDIUM, AND COMPUTER DEVICE," filed to the State Intellectual Property Office of People's Republic of China on Feb. 15, 2019, the entire content of which is incorporated herein by reference.

TECHNICAL FIELD

The present application relates to the field of computer network load balancing, and in particular to an intelligent hotspot scattering method, an apparatus, a storage medium, and a computer device.

BACKGROUND

In order to reduce the processing delay on the server side and improve the user experience, it is usually needed to scatter/balance URLs (Uniform Resource Locations), especially hotspot URLs.

In the existing technologies, usually, centralized URLs are randomly or evenly distributed to back-end machines (for example, origin node servers clusters, edge node servers clusters) to achieve load balancing for hotspot URLs.

However, in the solutions of the existing technologies, usually, the scattering operation is performed only after the hotspot URLs appear, to dispersedly distribute the requests for the hotspot URLs to multiple machines. Therefore, there are the following shortcomings.

1. No judgment, nor preprocessing, is made on the possible trend of the hotspot URLs in the early stage. The hotspots are directly scattered once they appear. Machines without caches will directly return to the upper node or origin, leading to great waste of traffics.

2. Even if all return-to-origin traffics are redirected back to a unified port by using the intra-group cache sharing scheme, in the case of a large hotspot file size (for example, the file size exceeds 1 G), the hotspot accumulation will not be solved before the machines finish fetching the file. The burden of the unified port is not reduced.

In order to solve the problems, new technical solutions need to be proposed.

SUMMARY

The intelligent hotspot scattering method according to the present application comprises:

learning a request quantity curve of a URL based on an artificial intelligence learning model and predicting a request quantity of the URL;

determining, as a first URL, a URL of which a predicted request quantity of the URL is greater than or equal to a first predetermined request quantity threshold corresponding to the URL, and performing a first hotspot scattering operation on the URL; and determining, as a second URL, a URL of which the request quantity of the URL cannot be predicted and an actual request quantity is greater than or equal to a second predetermined request quantity threshold corresponding to the URL, and performing a second hotspot scattering operation on the URL.

In the intelligent hotspot scattering method according to the present application, the performing a first hotspot scattering operation on the URL comprises:

randomly or evenly distributing requests for the first URL to processes of multiple cache servers and/or origin servers.

In the intelligent hotspot scattering method according to the present application, the performing a second hotspot scattering operation on the URL comprises:

searching for one or more destination processes of the second URL;

randomly or evenly distributing new requests for the first URL to processes of multiple cache servers and/or origin servers other than the one or more destination processes; and/or randomly or evenly redistributing old requests for the first URL to processes of multiple cache servers and/or origin servers other than the one or more destination processes.

In the intelligent hotspot scattering method according to the present application, the performing a second hotspot scattering operation on the URL further comprises:

determining that a size of a request file for the second URL is greater than a specified file size; and/or after the one or more destination process have executed responses to the requests for the second URL, the responses being obtaining and sending the request file or sending the request file, randomly or evenly distributing new requests for the first URL to processes of multiple cache servers and/or origin servers and/or randomly or evenly redistributing old requests for the first URL to processes of multiple cache servers and/or origin servers; and/or the learning a request quantity curve of a URL based on an artificial intelligence learning model and predicting a request quantity of the URL comprises:

performing cluster analysis on URLs by a clustering algorithm, automatically drawing a request quantity in a preset historical period or a real-time request quantity of URLs of a same category as a request quantity curve corresponding to URLs of the category, and predicting a request quantity of the URLs of the category according to the request quantity curve of the URLs of the category.

The intelligent hotspot scattering apparatus according to the present application comprises:

an artificial intelligence learning model, configured to learn a request quantity curve of a URL and predict a request quantity of the URL;

a first hotspot scattering module, configured to determine, as a first URL, a URL of which a predicted request quantity of the URL is greater than or equal to a first predetermined request quantity threshold corresponding to the URL, and perform a first hotspot scattering operation on the URL; and a second hotspot scattering module, configured to determine, as a second URL, a URL of which the request quantity of the URL cannot be predicted and an actual request quantity is greater than or equal to a second predetermined request quantity threshold corresponding to the URL, and perform a second hotspot scattering operation on the URL.

In the intelligent hotspot scattering apparatus according to the present application, the first hotspot scattering module is further configured to:

randomly or evenly distribute requests for the first URL to processes of multiple cache servers and/or origin servers.

In the intelligent hotspot scattering apparatus according to the present application, the second hotspot scattering module is further configured to:

search for one or more destination processes of the second URL;

randomly or evenly distribute new requests for the first URL to processes of multiple cache servers and/or origin servers other than the one or more destination processes; and/or randomly or evenly redistribute old requests for the first URL to processes of multiple cache servers and/or origin servers other than the one or more destination processes; and/or the artificial intelligence learning model is further configured to:

perform cluster analysis on URLs by a clustering algorithm, automatically drawing a request quantity in a preset historical period or a real-time request quantity of URLs of a same category as a request quantity curve corresponding to URLs of the category, and predict a request quantity of the URLs of the category according to the request quantity curve of the URLs of the category.

In the intelligent hotspot scattering apparatus according to the present application, the second hotspot scattering module is further configured to:

determine that a size of a request file for the second URL is greater than a specified file size; and/or after the one or more destination process have executed responses to the requests for the second URL, the responses being obtaining and sending the request file or sending the request file, randomly or evenly distribute new requests for the first URL to processes of multiple cache servers and/or origin servers and/or randomly or evenly redistribute old requests for the first URL to processes of multiple cache servers and/or origin servers.

The storage medium according to the present application has a computer program stored thereon that, when executed by a processor, implements the steps of the method described above.

The computer device according to the present application comprises a memory, a processor, and a computer program stored on the memory and capable of running on the processor, wherein the computer program implements, when executed by the processor, the steps of the method described above.

In the technical solutions of the present application, non-burst hotspot URL requests can be automatically predicted so that a first scattering operation can be performed in advance, and a second scattering operation can be performed on unpredictable burst hotspot URL requests, which speeds up the processing of hotspot businesses.

BRIEF DESCRIPTION OF THE DRAWINGS

The drawings to be described here are used to provide a further understanding of the embodiments of the present application, and constitute part of the present application. The schematic embodiments of the present application and their descriptions are used to explain the embodiments of the present application, and do not constitute any improper limitations to the embodiments of the present application. In the drawings.

DETAILED DESCRIPTION

The embodiments of the present application will be further described below with reference to the accompanying drawings by specific embodiments.

To make the purposes, technical solutions and advantages of the embodiments of the present application clearer, the technical solutions in the embodiments of the present application will be described clearly and completely with reference to the drawings in the embodiments of the present application. Obviously, the embodiments to be described are some, but not all, embodiments of the present application. Based on the embodiments of the present application, all other embodiments, obtained by a person of ordinary skill in the art without paying any creative effort, are included in the protection scope of the present application. It is to be noted that the embodiments of the present application and features in the embodiments may be combined if not conflict.

In order to solve the technical problems described in the background section, the present application provides the following technical solutions based on the general concept of predicting in advance before the predictable hotspots burst and performing a first processing operation (when it is predicted that the request quantity is greater than or equal to the predetermined request quantity of the specified URL), and performing a second processing, for example, fast processing operation when the unpredictable hotspots burst (that is, when the request quantity cannot be predicted and the actual request quantity is greater than or equal to the predetermined request quantity of the specified URL).

Figure 1:
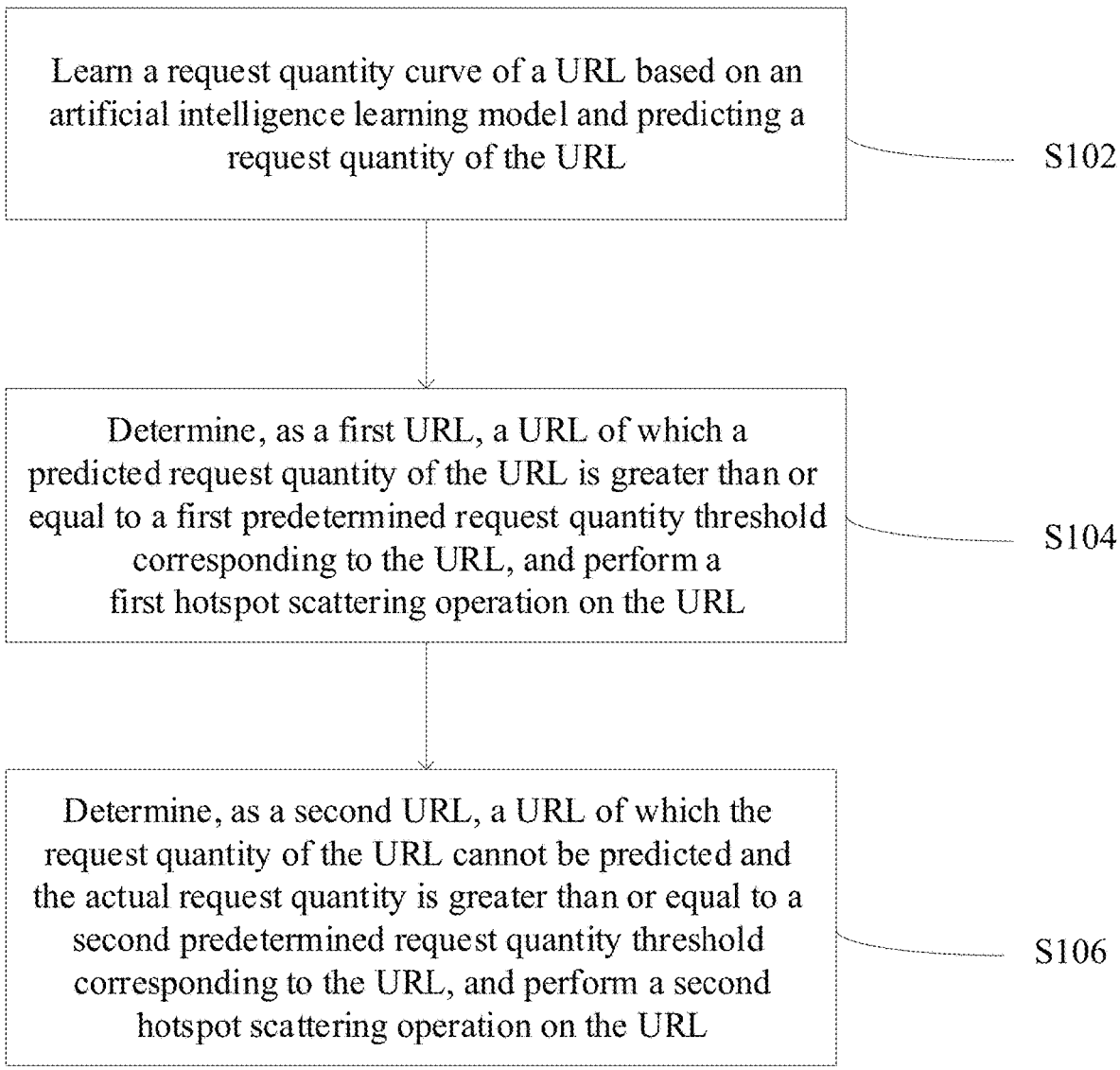
FIG. 1 exemplarily shows a schematic flowchart of an intelligent hotspot scattering method according to the present application.

FIG. 1 exemplarily shows a schematic flowchart of an intelligent hotspot scattering method according to the present application.

As shown in FIG. 1, the intelligent hotspot scattering method according to the present application comprises:

S102: learning a request quantity curve of a URL based on an artificial intelligence learning model and predicting a request quantity of the URL;

S104: determining, as a first URL, a URL of which the predicted request quantity of the URL is greater than or equal to a first predetermined request quantity threshold corresponding to the URL, and performing a first hotspot scattering operation on the URL; and S106: determining, as a second URL, a URL of which the request quantity of the URL cannot be predicted and the actual request quantity is greater than or equal to a second predetermined request quantity threshold corresponding to the URL, and performing a second hotspot scattering operation on the URL.

Optionally, in the S104, the step of performing a first hotspot scattering operation on the URL comprises:

randomly or evenly distributing requests for the first URL to processes of multiple cache servers and/or origin servers.

Optionally, in the S106, the step of performing a second hotspot scattering operation on the URL comprises:

searching for one or more destination processes of the second URL;

randomly or evenly distributing new requests for the first URL to processes of multiple cache servers and/or origin servers other than the one or more destination processes; and/or randomly or evenly redistributing old requests for the first URL to processes of multiple cache servers and/or origin servers other than the one or more destination processes.

Optionally, in the S106, the step of performing a second hotspot scattering operation on the URL further comprises:

determining that a size of a request file for the second URL is greater than a specified file size; and/or after the one or more destination process have executed responses to the requests for the second URL, the responses being obtaining and sending the request file or sending the request file, randomly or evenly distributing new requests for the first URL to processes of multiple cache servers and/or origin servers, and/or randomly or evenly redistributing old requests for the first URL to processes of multiple cache servers and/or origin servers; and/or S102 comprises:

performing cluster analysis on URLs by a clustering algorithm, automatically drawing a request quantity in a preset historical period or a real-time request quantity of URLs of a same category as a request quantity curve corresponding to URLs of the category, and predicting a request quantity of the URLs of the category according to the request quantity curve of the URLs of the category.

Optionally, the request quantity curve is a three-stage model curve.

Figure 2:
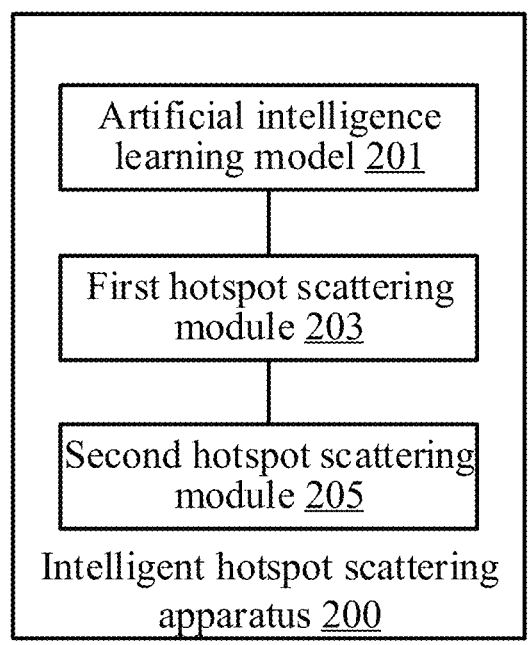
FIG. 2 exemplarily shows a schematic block diagram of an intelligent hotspot scattering apparatus according to the present application.

FIG. 2 exemplarily shows a schematic block diagram of an intelligent hotspot scattering apparatus according to the present application.

As shown in FIG. 2, the intelligent hotspot scattering apparatus 200 according to the present application comprises:

an artificial intelligence learning model 201, configured to learn a request quantity curve of a URL and predict a request quantity of the URL;

a first hotspot scattering module 203, configured to determine, as a first URL, a URL of which a predicted request quantity of the URL is greater than or equal to a first predetermined
request quantity threshold corresponding to the URL, and perform a first hotspot scattering operation on the URL; and a second hotspot scattering module 205 configured to determine, as a second URL, a URL of which the request quantity of the URL cannot be predicted and an actual request quantity is greater than or equal to a second predetermined request quantity threshold corresponding to the URL, and perform
a second hotspot scattering operation on the URL.

Optionally, the first hotspot scattering module 203 is further configured to:

randomly or evenly distribute requests for the first URL to processes of multiple cache servers and/or origin servers.

Optionally, the second hotspot scattering module 205 is further configured to:

Search for one or more destination processes of the second URL;

randomly or evenly distribute new requests for the first URL to processes of multiple cache servers and/or origin servers other than the one or more destination processes; and/or randomly or evenly redistribute old requests for the first URL to processes of multiple cache servers and/or origin servers other than the one or more destination processes.

Optionally, the second hotspot scattering module 205 is further configured to:

Determine that a size of a request file for the second URL is greater than a specified file size; and/or after the one or more destination process have executed responses to the requests for the second URL, the responses being obtaining and sending the request file or sending the request file, randomly or evenly distribute new requests for the first URL to processes of multiple cache servers and/or origin servers and/or randomly or evenly redistribute old requests for the first URL to processes of multiple cache servers and/or origin servers; and/or the artificial intelligence learning model 201 is further configured to:

perform cluster analysis on URLs by a clustering algorithm, automatically drawing a request quantity in a preset historical period or a real-time request quantity of URLs of a same category as a request quantity curve corresponding to URLs of the category, and predict a request quantity of the URLs of the category according to the request quantity curve of the URLs of the category.

In combination with the method and apparatus according to the present application, a storage medium is further provided, having a computer program stored thereon that, when executed by a processor, implements the steps of the method described above.

In combination with the method and apparatus according to the present application, a computer device is further provided, comprising a memory, a processor, and a computer program stored on the memory and capable of running on the processor, wherein the computer program implements, when executed by the processor, the steps of the method described above.

In order to enable those skilled in the art to more clearly understand the technical solutions of the present application, the present application will be described below by specific embodiments.

Figure 3:
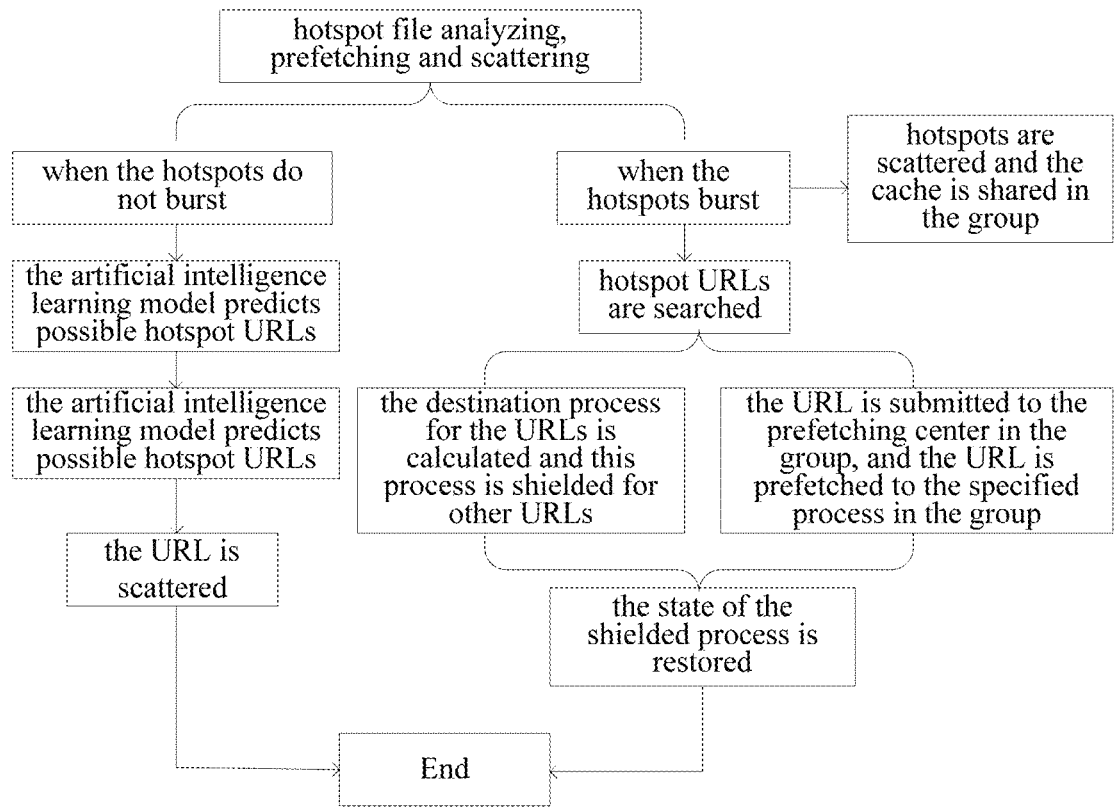
FIG. 3 exemplarily shows a schematic diagram of an embodiment of the intelligent hotspot scattering method according to the present application.

FIG. 3 exemplarily shows a schematic diagram of an embodiment of the intelligent hotspot scattering method according to the present application.

As shown in FIG. 3, in this embodiment, "hotspot file analyzing, prefetching and scattering," corresponding to the intelligent hotspot scattering method described with reference to FIG. 1, and this embodiment comprises the following processing steps.

1. When the predictable hotspots do not burst, corresponding to the step S104

1.1 The artificial intelligence learning model predicts possible hotspot URLs, corresponding to the step S102.

For example, the key point of hotspot URL prediction may be a model diagram matched by artificial intelligence, corresponding to the request quantity curve, and the parameters (for example, the first predetermined request quantity threshold corresponding to the URL) are calculated for different businesses (for example, corresponding to different URLs).

Figure 4:
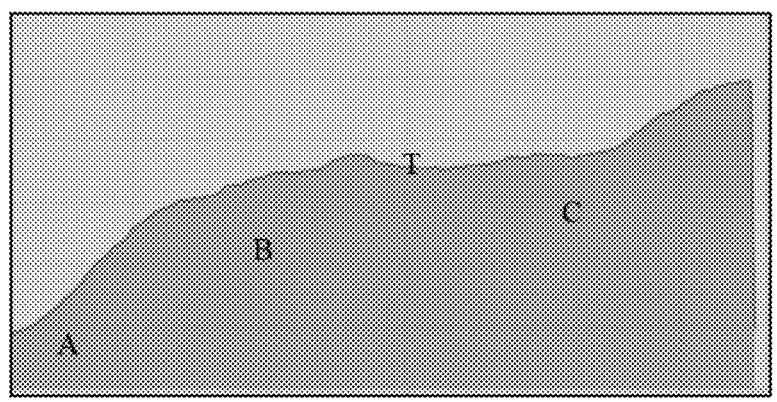
FIG. 4 exemplarily shows an example of a model diagram matched by an artificial intelligence learning model that may be used in the intelligent hotspot scattering method according to the present application.

FIG. 4 exemplarily shows an example of a model diagram matched by an artificial intelligence learning model that may be used in the intelligent hotspot scattering method according to the present application.

For example, the storage medium that implements the intelligent hotspot scattering method using the model diagram can store software installation packages in the form of apk, etc., to facilitate product release.

As shown in the example model diagram shown in FIG. 4, three stages A, B, and C are included (i.e., the three-stage model curve). At stage A, the business has not burst yet, with a low request quantity at the beginning. At stage B, the request quantity increases and higher business value is reached. At stage C, the business bursts, and the request quantity reaches a peak in an instant.

For example, the model predicts that there may be a burst trend at stage C during the A→B. For example, the first predetermined request quantity threshold corresponding to the URL may be set as the value of the ordinate corresponding to the demarcation point T of the stage B and the stage C.

Optionally, the determined possible URL (that is, the URL of which predicted request quantity of the URL is greater than or equal to the first predetermined request quantity threshold corresponding to the URL) may be submitted to the prefetching center in a group (for example, a cluster of multiple cache servers). The prefetching center is for example, the cache server, in the cluster of servers, which is designated as a unified port to perform a prefetching operation.

1.2 The URL is submitted to the prefetching center in the group, and the URL is prefetched to the specified process in the group.

For example, the prefetching center in the group may perform the following operations.

1.2.1 The obtained URL is calculated to obtain the upper-level node of the URL, other machines in the parent node or the node of same province, then try to detect the parent node and the origin and calculate the downloading speeds of the parent node and the origin, and the node with faster downloading speed is used as the selected upper-level node.

1.2.2 The idle process in the entire group of machines is selected and used as the process A to which the URL is prefetched. The process A executes the http request to fetch the file as the cache basic file afile (local file). After the file is fetched, the method proceeds to the next step.

1.2.3 The process ID pid of the machine in which the URL will fall after the scattering is calculated. The prefetching program informs these processes to get the file afile from the previous process A, so as to ensure that there is only one request of returning to the upper-level node (that is, the parent node) or the origin.

1.3 The URL is scattered.

For example, according to the scattering rules, for example, random scattering rule or even scattering rule, etc., the URL may be scattered on the dispatch server, and the hotspots may be solved quickly before they burst.

However, some hotspots have no warning in the early stage, that is, the request quantity is unpredictable. In this case, the method to be described below is used.

2. When the unpredictable hotspots burst, corresponding to the step S106

2.1 Hotspots are scattered and cache is shared in the group.

For example, when hotspots burst, the hotspot detection device on the server (for example, may correspond to the second hotspot scattering module 205) will recognize the burst hotspots and then scatters them. For example, on a server without a cache, the request may be directed to the port being hash processed originally in the group, so as to share the cache in the group.

However, when the size of the file exceeds 1 G (corresponding to the specified file size), in the case of a large request quantity, other servers in the group are unable to quickly complete the fetching of URLs, resulting in the accumulation of the requests. Consequently, it is failed to realize the scattering effect and unable to solve the problem quickly. In this case, the following operations may be performed to reduce the processing delay and improve the user experience 2.2 Hotspot URLs are searched for.

2.3 The destination process for the URLs is calculated and this process is shielded for other URLs.

For example, the destination process B for the hotspot URLs may be calculated, requests of other businesses destined to this process is rehashed, the businesses are directed to other idle processes so that other businesses are not affected. In this case, the hotspot URLs are still operating normally in the busy process.

Optionally, for download-type businesses or other businesses that support broken-point continuingly-transferring, the links remained in the shielded process B may be forcibly cancelled, so that the links may be prefetched when they are reconnected to the server and the smooth running of the businesses may be automatically realized after scattering.

That is, in this case, by process isolation, when a single business bursts and cannot be recovered instantly, other businesses are firstly removed from the process that executes the burst business so as to ensure the normal operation of the other businesses.

2.4. The URL is submitted to the prefetching center in the group, and the URL is prefetched to the specified process in the group.

This step contains the same operations in the step 1.2.

2.5. The state of the shielded process is restored.

After the prefetching operation of the process B is completed, the state of the shielded process B is restored, thereby restoring normal businesses. The shielded process B may be used to be allocated to and execute other businesses.

According to the technical solutions of the present application, it has the following advantages.

1. Non-burst hotspot URL requests can be automatically predicted, so that the first scattering operation (comprising prefetching to the cache) may be performed in advance, and the problem may be solved before the hotspots have substantially affected the businesses (for example, a large delay); the second scattering operation may be performed on unpredictable hotspot URL requests, thereby speeding up the processing of the hotspot businesses.

2. For example, due to the operation of redirecting all back-to-origin traffic back to a unified port, traffic that returns to the upper layer (that is, the origin in the upper layer) to get resources are reduced, the cost is saved, and the bearing capacities of the edge nodes and the upper-layer nodes are increased. Further, by selecting an idle link and an idle process to perform a quick back-to-origin prefetching and then quickly copying the file to other machines that are connected through the intranet and that correspond to the unified port, back-to-origin traffic that returns to the upper layer can be saved.

3. After the hotspot request processing is completed, other requests may be allocated to the process originally used for hotspot request processing, and the impact of the hotspots may be repaired as soon as possible.

4. By process isolation, when a single business bursts and cannot be recovered instantly, other businesses are firstly removed from the process that executes the burst business, so as to ensure the normal operation of other businesses.

The content described above may be implemented independently or in combination, and those variations are within the protection scope of the present application.

It may be understood by a person of ordinary skill in the art that all or some of the steps of the method, and functional modules/units in the system and apparatus disclosed above may be implemented as software, firmware, hardware, and appropriate combinations thereof. In the hardware implementations, the division between functional modules/units mentioned in the above description does not necessarily correspond to the division of physical components. For example, a physical component may have multiple functions, or one function or step may be executed by several physical components. Some or all of the components may be implemented as software executed by a processor, for example a digital signal processor or a microprocessor, or as hardware, or as an integrated circuit, for example an application specific integrated circuit. Such software may be distributed on computer-readable media, and the computer-readable media may comprise computer storage media (or non-transitory media) and communication media (or transitory media). As known to a person of ordinary skill in the art, the term "computer storage media" comprise volatile and non-volatile, removable and non-removable media implemented in any method or technology for storing information (such as computer-readable instructions, data structures, program modules, or other data). The computer storage media comprise but are not limited to RAMs, ROMs, EEPROMs, flash memories or other memory technologies, CD-ROMs, digital versatile disks (DVDs) or other optical disk storage, magnetic cassettes, magnetic tapes, magnetic disk storage or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

Finally, it should be noted that the above embodiments are only provided to illustrate the technical solutions of the present application, but not to limit the present application. Although the present application has been described in detail with reference to the above embodiments, it should be understood by a person of ordinary skill in the art that the technical solutions described in the above embodiments can be modified, or some of the technical features thereof can be equivalently replaced. These modifications or replacements will not cause the essence of the corresponding technical solutions to deviate from the spirit and scope of the technical solutions of the embodiments of the present application.

INDUSTRIAL APPLICABILITY

The embodiments of the present application provide an intelligent hotspot scattering method and an intelligent hotspot scattering apparatus. A request quantity curve of a URL may be learned based on an artificial intelligence learning model and a request quantity of the URL may be predicted; a URL of which the predicted request quantity of the URL is greater than or equal to a first predetermined request quantity threshold corresponding to the URL may be determined as a first URL, and a first hotspot scattering operation may be performed on the URL; and a URL of which the request quantity of the URL cannot be predicted and the actual request quantity is greater than or equal to a second predetermined request quantity threshold corresponding to the URL may be determined as a second URL, and a second hotspot scattering operation may be performed on the URL. Non-burst hotspot URL requests can be automatically predicted so that a first scattering operation can be performed in advance, and a second scattering operation can be performed on unpredictable burst hotspot URL requests, which speeds up the processing of hotspot businesses.

The invention claimed is:

1. An intelligent hotspot scattering method comprising:
    learning request quantity curves of a plurality of URLs based on an artificial intelligence learning model and performing request quantity prediction on the plurality of URLs;
    determining a first URL from the plurality of URLs, a predicted request quantity of the first URL being greater than or equal to a first predetermined request quantity threshold corresponding to the first URL, performing a first hotspot scattering operation on the first URL; and
    determining a second URL from the plurality of URLs, a request quantity of the second URL being not predictable and an actual request quantity of the second URL being greater than or equal to a second predetermined request quantity threshold corresponding to the second URL, performing a second hotspot scattering operation on the second URL.

2. The intelligent hotspot scattering method according to claim 1, wherein performing the first hotspot scattering operation on the first URL includes:
    randomly or evenly distributing requests for the first URL to processes of a plurality of servers, the plurality of servers including at least one of a cache server or an origin server.

3. The intelligent hotspot scattering method according to claim 1, wherein performing the second hotspot scattering operation on the second URL includes:
    searching for one or more destination processes of the second URL; and
    randomly or evenly distributing new requests for the first URL to processes of a plurality of servers other than the one or more destination processes, the plurality of servers including at least one of a cache server or an origin server.

4. The intelligent hotspot scattering method according to claim 3, wherein performing the second hotspot scattering operation on the second URL further includes at least one of:
    determining that a size of a request file for the second URL is greater than a specified file size; or
    randomly or evenly distributing the new requests for the first URL to the processes of the plurality of servers after the one or more destination process have executed responses to requests for the second URL, the responses including:
    obtaining and sending the request file; or
    sending the request file.

5. The intelligent hotspot scattering method according to claim 1, wherein performing the second hotspot scattering operation on the second URL includes:
    searching for one or more destination processes of the second URL; and
    randomly or evenly redistributing old requests for the first URL to processes of a plurality of servers other than the one or more destination processes, the plurality of servers including at least one of a cache server or an origin server.

6. The intelligent hotspot scattering method according to claim 5, wherein performing the second hotspot scattering operation on the second URL further includes at least one of:
    determining that a size of a request file for the second URL is greater than a specified file size; or randomly or evenly redistributing the old requests for the first URL to the processes of the plurality of servers after the one or more destination process have executed responses to requests for the second URL, the responses including:
  obtaining and sending the request file; or
  sending the request file.

7. The intelligent hotspot scattering method according to claim 1, wherein learning the request quantity curves of the plurality of URLs based on the artificial intelligence learning model and performing the request quantity prediction on the plurality of URLs includes:
  performing cluster analysis on the URLs using a clustering algorithm;
  automatically drawing a request quantity in a preset historical period or a real-time request quantity of one or more URLs of the plurality of URLs that belong to a same category as a request quantity curve corresponding to the one or more URLs of the category; and
  predicting a request quantity of the one or more URLs of the category according to the request quantity curve of the one or more URLs of the category.

8. A computer device comprising:
  a memory storing a computer program; and
  a processor configured to execute the computer program to:
    learn request quantity curves of a plurality of URLs based on an artificial intelligence learning model and perform request quantity prediction on the plurality of URLs;
    determine a first URL from the plurality of URLs, a predicted request quantity of the first URL being greater than or equal to a first predetermined request quantity threshold corresponding to the first URL, performing a first hotspot scattering operation on the first URL; and
    determine a second URL from the plurality of URLs, a request quantity of the second URL being not predictable and an actual request quantity of the second URL being greater than or equal to a second predetermined request quantity threshold corresponding to the second URL, performing a second hotspot scattering operation on the second URL.

9. The computer device according to claim 8, wherein the processor is further configured to execute the computer program to:
  randomly or evenly distribute requests for the first URL to processes of a plurality of servers, the plurality of servers including at least one of a cache server or an origin server.

10. The computer device according to claim 8, wherein the processor is further configured to execute the computer program to:
  search for one or more destination processes of the second URL; and
  randomly or evenly distribute new requests for the first URL to processes of a plurality of servers other than the one or more destination processes, the plurality of servers including at least one of a cache server or an origin server.

11. The computer device according to claim 10, wherein the processor is further configured to execute the computer program to perform at least one of:
  determining that a size of a request file for the second URL is greater than a specified file size; or
  randomly or evenly distributing the new requests for the first URL to the processes of the plurality of servers after the one or more destination process have executed responses to requests for the second URL, the responses including:
    obtaining and sending the request file; or
    sending the request file.

12. The computer device according to claim 8, wherein the processor is further configured to execute the computer program to:
  search for one or more destination processes of the second URL; and
  randomly or evenly redistribute old requests for the first URL to processes of a plurality of servers other than the one or more destination processes, the plurality of servers including at least one of a cache server or an origin server.

13. The computer device according to claim 12, wherein the processor is further configured to execute the computer program to perform at least one of at least one of:
  determining that a size of a request file for the second URL is greater than a specified file size; or
  randomly or evenly redistributing the old requests for the first URL to the processes of the plurality of servers after the one or more destination process have executed responses to requests for the second URL, the responses including:
    obtaining and sending the request file; or
    sending the request file.

14. The computer device according to claim 8, wherein the processor is further configured to execute the computer program to:
  perform cluster analysis on the URLs using a clustering algorithm;
  automatically draw a request quantity in a preset historical period or a real-time request quantity of one or more URLs of the plurality of URLs that belong to a same category as a request quantity curve corresponding to the one or more URLs of the category; and
  predict a request quantity of the one or more URLs of the category according to the request quantity curve of the one or more URLs of the category.

15. A non-transitory computer-readable storage medium storing a computer program that, when executed by a processor, causes the processor to:
  learn request quantity curves of a plurality of URLs based on an artificial intelligence learning model and perform request quantity prediction on the plurality of URLs;
  determine a first URL from the plurality of URLs, a predicted request quantity of the first URL being greater than or equal to a first predetermined request quantity threshold corresponding to the first URL, performing a first hotspot scattering operation on the first URL; and
  determine a second URL from the plurality of URLs, a request quantity of the second URL being not predictable and an actual request quantity of the second URL being greater than or equal to a second predetermined request quantity threshold corresponding to the second URL, performing a second hotspot scattering operation on the second URL.

16. The non-transitory computer-readable storage medium according to claim 15, wherein the computer program further causes the processor to:
  search for one or more destination processes of the second URL; and
  randomly or evenly distribute new requests for the first URL to processes of a plurality of servers other than the one or more destination processes, the plurality of servers including at least one of a cache server or an origin server.

17. The non-transitory computer-readable storage medium according to claim 16, wherein the computer program further causes the processor to perform at least one of:
determining that a size of a request file for the second URL is greater than a specified file size; or
randomly or evenly distributing the new requests for the first URL to the processes of the plurality of servers after the one or more destination process have executed responses to requests for the second URL, the responses including:
obtaining and sending the request file; or
sending the request file.

18. The non-transitory computer-readable storage medium according to claim 15, wherein the computer program further causes the processor to:
search for one or more destination processes of the second URL; and
randomly or evenly redistribute old requests for the first URL to processes of a plurality of servers other than the one or more destination processes, the plurality of servers including at least one of a cache server or an origin server.

19. The non-transitory computer-readable storage medium according to claim 18, wherein the computer program further causes the processor to perform at least one of:
determining that a size of a request file for the second URL is greater than a specified file size; or
randomly or evenly redistributing the old requests for the first URL to the processes of the plurality of servers after the one or more destination process have executed responses to requests for the second URL, the responses including:
obtaining and sending the request file; or
sending the request file.

20. The non-transitory computer-readable storage medium according to claim 15, wherein the computer program further causes the processor to:
perform cluster analysis on the URLs using a clustering algorithm;
automatically draw a request quantity in a preset historical period or a real-time request quantity of one or more URLs of the plurality of URLs that belong to a same category as a request quantity curve corresponding to the one or more URLs of the category; and
predict a request quantity of the one or more URLs of the category according to the request quantity curve of the one or more URLs of the category.

* * * * *